United States Patent
Wallace et al.

(10) Patent No.: US 12,054,621 B2
(45) Date of Patent: *Aug. 6, 2024

(54) HEAT STABLE INKJET INKS

(71) Applicant: SUN CHEMICAL CORPORATION, Parsippany, NJ (US)

(72) Inventors: Paul Wallace, South Normandton (GB); James Matthews, South Normandton (GB)

(73) Assignee: Sun Chemical B.V., Weesp (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/267,022

(22) PCT Filed: Apr. 1, 2022

(86) PCT No.: PCT/GB2022/050833
§ 371 (c)(1),
(2) Date: Jun. 13, 2023

(87) PCT Pub. No.: WO2022/208111
PCT Pub. Date: Oct. 6, 2022

(65) Prior Publication Data
US 2024/0034893 A1    Feb. 1, 2024

Related U.S. Application Data

(60) Provisional application No. 63/169,320, filed on Apr. 1, 2021.

(51) Int. Cl.
| | |
|---|---|
| *C09D 11/106* | (2014.01) |
| *B41J 2/21* | (2006.01) |
| *C09D 11/107* | (2014.01) |
| *C09D 11/14* | (2006.01) |
| *C09D 11/322* | (2014.01) |
| *C09D 11/38* | (2014.01) |

(52) U.S. Cl.
CPC ............ *C09D 11/106* (2013.01); *B41J 2/21* (2013.01); *B41J 2/2107* (2013.01); *C09D 11/107* (2013.01); *C09D 11/14* (2013.01); *C09D 11/322* (2013.01); *C09D 11/38* (2013.01)

(58) Field of Classification Search
CPC .... B41J 29/02; B41J 2/17513; B41J 2/17509; B41J 29/13; B41J 2/17553; B41J 2/1606; B41J 2/1642; B41J 2/1609; B41J 2/1433; B41J 2/164; B41J 2/162; B41J 2/161; B41J 2/19; B41J 15/04; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 2/04588; B41J 2/04595; B41J 2/04586; B41J 2/14274; B41J 2/01; B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106
See application file for complete search history.

(56) References Cited

U.S. PATENT DOCUMENTS

| | | | |
|---|---|---|---|
| 5,750,594 A * | 5/1998 | Page | C09D 11/40 106/31.86 |
| 5,954,866 A * | 9/1999 | Ohta | C09D 11/322 106/31.89 |
| 6,153,001 A * | 11/2000 | Suzuki | C09D 11/322 106/31.86 |
| 6,354,692 B1 | 3/2002 | Ross | |
| 7,384,465 B2 | 6/2008 | Jackson | |
| 8,858,695 B2 | 10/2014 | Gu et al. | |
| 11,795,337 B2 * | 10/2023 | Wallace | B41J 2/2107 |
| 11,945,959 B2 * | 4/2024 | Wallace | B41J 2/2107 |
| 2001/0025588 A1 * | 10/2001 | Takemoto | C09D 11/30 106/31.71 |
| 2005/0199152 A1 * | 9/2005 | Hale | B41J 2/315 347/100 |
| 2015/0090155 A1 | 4/2015 | Cross et al. | |

(Continued)

FOREIGN PATENT DOCUMENTS

| | | |
|---|---|---|
| EP | 834537 A1 | 4/1998 |
| EP | 0979734 A1 | 2/2000 |

(Continued)

OTHER PUBLICATIONS

International Search Report issued in International Application No. PCT/GB2022/050833, mailed Jun. 20, 2022.

(Continued)

*Primary Examiner* — Manish S Shah
(74) *Attorney, Agent, or Firm* — Sun Chemical B.V.

(57) ABSTRACT

The present invention relates to an inkjet ink composition comprising a pigment colourant, a polymeric dispersant, a carbohydrate, water and an organic co-solvent, wherein the polymeric dispersant is selected from a poly(styrene-maleic acid) copolymer, a poly(styrene-maleamic acid) copolymer or a combination thereof.

17 Claims, No Drawings

(56) References Cited

U.S. PATENT DOCUMENTS

2015/0166803 A1\* 6/2015 Jhaveri ............... C09D 11/107
                                                                               524/521
2017/0145239 A1\* 5/2017 Mozel ................. B41J 2/2107
2020/0308437 A1\* 10/2020 Guo ................... B41M 5/0023

FOREIGN PATENT DOCUMENTS

| EP | 1108756 A2 | 6/2001 |
| EP | 2099869 A2 | 9/2009 |
| EP | 2325269 A1 | 5/2011 |
| GB | 2332438 A | 6/1999 |
| JP | H11302584 A | 11/1999 |
| JP | 2001348519 | 12/2001 |
| JP | 2003238856 A | 8/2003 |
| JP | 2003277653 A | 10/2003 |
| KR | 20070021759 A | 3/2007 |
| WO | WO 2020242441 A1 | 12/2020 |

OTHER PUBLICATIONS

Written Opinion of the International Searching Authority issued in International Application No. PCT/GB2022/050833, mailed Jun. 20, 2022.
International Preliminary Report on Patentability (Chapter 1 of the Patent Cooperation Treaty) issued in International Application No. PCT/GB2022/050833, mailed Feb. 20, 2023.

\* cited by examiner

HEAT STABLE INKJET INKS

CROSS REFERENCE TO RELATED APPLICATIONS

The present application is a § 371 National Phase application based on PCT/GB2022/050833 filed Apr. 1, 2022, which claims the benefit of U.S. Provisional Application No. 63/169,320, filed Apr. 1, 2021, the subject matter of each of which is incorporated by reference in their entirety.

The present invention relates to water-based pigment inks that are suitable for the decoration of substrates such as metal, glass and high glass transition temperature plastics (e.g. polycarbonate substrates) using inkjet printing. Following printing, the substrates can be heat treated at high temperatures and surprisingly exhibit reduced colour shift as measured by $\Delta E$.

When digitally decorated substrates such as metal, glass and high glass transition temperature (Tg) plastics (such as polycarbonate) are printed with water-based pigment inks the substrates typically need to be heated at high temperatures (e.g. $\geq 120°$ C., or in some cases $\geq 140°$ C., even $\geq 160°$ C., or even $\geq 180°$ C., and in some cases even $\geq 200°$ C.) to ensure the ink films are dry and there is no residual ink transferred to the underside of the substrate roll or sheet—this is known as blocking. In most cases, when inks containing organic pigments are heated to cure the printed images, the measured colour can shift on heating and change significantly. This measurement in the difference of the thermally cured images is typically compared to the colour measured when air dried and not thermally cured. The industry standards are usually a $\Delta E$ of 3.0 or less as the maximum colour shift tolerable.

Whilst this phenomenon is well-known in the art, there is little understanding of the causes of the problem and furthermore no documented solutions to this problem.

U.S. Pat. No. 7,384,465 describes a combination of two or more pigments, for example Pigment Blue 15:3 or 15:4, in combination with Pigment Violet 23, that can provide printed images with improved Chroma, optical density and gloss. The hue angle was deemed to be important in this patent but no reference is made to the $\Delta E$ and the measured colour change of the pigments on curing the inkjet printed films.

Various patents describe mechanical printing methods for colour correction, especially when using multi-pass printing, including EP0979734 and U.S. Pat. No. 6,354,692. These two patents discuss methods to obtain greater colour uniformity of printed images by using multi-pass printing techniques. This is not however possible on most fixed array high speed digital printing presses and furthermore will not in any way eradicate or minimise any colour shift effects of the inks when cured in the thermal heat processes required.

Surface modification of pigments by covalently linking functional organic molecules to the surface has also been explored in U.S. Pat. No. 8,858,695, EP834537 and EP2099869. These methods are more to stabilize the pigment in a printing ink and none of these documents describes any measured colour shift when the printed images are cured. The patents are all concerned with changing the surface of the pigment particles such that a polymer can be covalently bound to the surface, without affecting the chromophore. However, it is hypothesised that when these covalently bound pigment dispersions are formulated into inks and then heated at significant curing temperatures, colour shifts which are outside of the acceptable levels would still be observed.

JP2003277653 discloses that incorporating a saccharide into a set of lower-pigment concentration inks when used in combination with standard CMYK pigment inks can reduce wicking and feathering. This is simply the improvement of image quality from the ink due to wicking and feathering—there is no reference made to colour shifts on heating the printed inks.

There are several patents describing the incorporation of sugars, carbohydrates or saccharides into inkjet inks, including JP2001348519 on photocurable inkjet inks; US20150090155 on using saccharides to reduce nozzle plate wetting in inkjet inks; EP1108756 which describes the incorporation of saccharides in inkjet inks to improve inkjet printing performance; GB2332438 which describes the incorporation of sugars into dye-based inks to print onto sugar-coated papers to improve adhesion; KR20070021759 which describes the use of water-based inkjet inks containing sugars to improve rub fastness and prevent bleeding when printed onto papers; JP2003238856 which describes the same principle to impart good resistance to smear and prevent colour bleeding; and JPH11302584 which uses sugars to improve nozzle clogging in black inks.

None of these documents solves the problem addressed in the present invention. Namely, none of these documents provides an ink that can minimise the colour shift that occurs in organic pigments when substrates are heated to high temperatures to enable facile ink curing.

The inventors have found that adding small quantities of carbohydrates to water-based pigment inks can provide a blocking site and prevent unwanted chromophore interactions with other components in the inks. Furthermore, as discussed in more detail below, all of the advantages of state-of-the-art printing inks can still be utilised with the added advantage of reducing any colour shift on high temperature curing to a level which is acceptable.

Not only does the present invention improve the colour shift phenomenon described previously to an acceptable level, there are also several other technical advantages. The first is that inclusion of carbohydrates in the inks helps to improve the resolubility of the inks if the digital printing heads are allowed to dry out (air dry) for any length of time. In the industry, a rapid start up is required which requires inks which are readily soluble in flushing or cleaning liquids. Indeed, the present inventors have found that incorporation of carbohydrates to digital printing inks, in addition to the desired reduction in the colour shift, allowed the better resolubility of air-dried ink films. Again, the cited documents do not teach about resolubility, rather they only mention nozzle clogging and the prevention of nozzle clogging during jetting.

Furthermore, by careful selection of the ink ingredients, especially the carbohydrates used, certain regulatory requirements, such as Swiss Ordinance, Nestle Guidance, FDA and FD&C regulations can all be met with these series of inks permitting the use in food, drug, cosmetic and indirect food contact (packaging) applications. In addition, the careful selection of carbohydrates and use with acid functional polymers in the ink, can permit the formation of cross-linked polymers on thermal curing, which in turns greatly assists with the alcohol and water rub-resistance of the prints.

Another significant technical advantage with the inks of the present invention is the air-drying speed of the inks. In order for the inks to be tack-free and resistant to bleed or dot gain prior to curing (which compromises image quality), the solvents contained in the ink are preferably evaporated quickly. This is a trade-off between an ink which jets well and does not dry out in the print head with an ink that may jet well and is vulnerable to drying out in the print head. Typically, co-solvents which display humectant activity, such as glycols, are selected for inkjet printing inks. However, the problem with such co-solvents is that significant quantities (i.e. 70% or more by weight) are required in the inks to obtain good jetting characteristics and prevent drying out on the nozzle plate of the print head, causing the air-drying speed to be very slow, and inks are often far too tacky. In order to overcome this problem, it is possible to reduce the levels of such co-solvents in the inks and introduce a carbohydrate to prevent colour shift. The carbohydrate is advantageous as it aids the jetting, acts as a humectant, and does not need to evaporate.

A further advantage is that certain classes of pigments which typically exhibit significant colour shift on heating can be used in ink formulations with reduced colour shift.

A further advantage is that the carbohydrates selected are typically all natural and obtained from sustainable sources. In addition, the carbohydrates are all suitable for human consumption and can therefore be used in inks which are for pharmaceutical, food, indirect food contact and cosmetic applications. Typically, the carbohydrates are all approved for food use.

There are no solutions to the problem described herein in the art. Indeed, in view of the art, the skilled person would consider that the only way to prevent observed colour shifts in inks on thermal curing is to reformulate the inks with materials which may not interact with the pigments to cause such an effect. The problem with this approach is that many formulations can be derived which display superior jetting, good latency and open time, good resolubility, excellent printed images with durable films being formed, but they all suffer from colour shift on heating. By removing the components of the inks which may be causing this colour shift, then one or more of the advantages listed above are lost in a trade-off for less colour shift. In the present invention, the inventors have found that adding an extra component to the inks enables colour shift to by minimised whilst also preserving the advantages mentioned above.

Citation or identification of any document in this application is not an admission that such represents prior art to the present invention.

DETAILED DESCRIPTION

Digital decoration of objects such as metal and coated metal, glass, high glass transition temperature (Tg) plastics such as polycarbonates and uPVC all typically require high temperature (i.e. temperatures ≥120° C.) curing following the printing process. As used herein, high glass transition temperature plastics refer to plastics having a Tg ≥120° C., preferably ≥150° C. This curing process usually results in a significant colour shift of most of the printed colours following heat treatment. In the present invention, the colour shift has been minimised or prevented by the inclusion of carbohydrates in the inkjet inks which has also enhanced other properties of the inkjet inks including faster air-dry times, alcohol and water rub resistance, excellent resolubility of air-dried films and stable ink formulations.

Decoration of objects with digital inkjet pigment inks is well documented and is a rapidly growing field, especially with a view to personalisation. Typically, when water-based inks are printed onto the objects or substrates, the air-dried ink needs to undergo a further drying and curing process which fixes the pigment particles to the substrate, which is normally achieved by incorporating at least one polymer with binder functionality into the ink. This is typically a dry heat process and is usually performed at temperatures between 50-220° C., depending on the line speed of the printing press and the printed articles in question. In order to have rapid production, the line speeds of the printing presses need to be high, of the order 100-400 m/minute, which necessitates higher curing temperature conditions. During the high temperature heat curing processes there can be noticeable colour shift, especially with colourants such as Pigment Blue 15 and Pigment Yellow 155. It is hypothesised that certain components of the ink are interacting with the chromophore in the pigment and shifting the perceived (and measured) colour. In fact, in most cases, the colour shift measured between the native colourant and that when heat cured in an inkjet printed film can be significant.

General printing industry guidelines are for a colour shift of less than 3.0 when measured as ΔE, but preferably even less than this. By including carbohydrates into the inks, the colour shift can be minimised and furthermore, the inclusion of the carbohydrates into the inks assists with the inherent resolubility of the inks, if they are allowed to dry out at room temperature. This in turn helps with the general operability of the printing presses and minimises downtime. In addition, inclusion of carbohydrates also benefits the humectant capability of the ink formulations, meaning lower amounts of high boiling glycol solvents (i.e. those having a boiling point of ≥180° C.) need to be incorporated into the inks and hence the drying times can be reduced further as there is less content of high boiling co-solvents in the inks to evaporate on curing. Finally, the careful selection of the agents used in the formulations to reduce the colour shifts are considered to include those which are compliant with the food regulations and can be used in highly regulated industries such as food contact, indirect food contact, pharmaceuticals and cosmetics.

The present invention provides an inkjet ink composition comprising a pigment colourant, a polymeric dispersant, a carbohydrate, water and an organic co-solvent, wherein the polymeric dispersant is selected from a poly(styrene-maleic acid) copolymer, a poly(styrene-maleamic acid) copolymer or a combination thereof. As will be understood by the skilled person, the ink composition according to the present invention is a water-based pigment ink.

The present invention also provides a water-based pigment ink set comprising at least a pigment colourant, a polymeric dispersant (which can also preferably act as a binder), water, a carbohydrate, an organic solvent and optionally an additional surfactant and other solution polymers or polymer dispersions.

As understood in the printing art, the term "solution polymer" (also known as an alkali-soluble polymer) typically refers to polymers or copolymers comprising acid groups as part of the monomer blend. The acid groups may be on the polymer backbone or on side-chains to the polymer backbone. When the acidic groups of the polymer are neutralized with a base including but not limited to ammonia, amines (e.g. triethylamine triethanolamine) or inorganic bases (e.g. NaOH, KOH), the polymers can then be dissolved in water to form an aqueous solution. The term "solution polymer" can also refer to polymers or copolymers including water-solubilizing hydrophilic groups on the polymer backbone or on polymer side-chains that can render the polymers soluble in water to form an aqueous solution. Suitable hydrophilic groups include hydroxyl-functional groups, amino-functional groups or polyether repeating units such as polyethylene glycol or polypropylene glycol. A solution polymer can comprise said acidic groups as well as including said water-solubilizing hydrophilic groups.

Preferably, the present invention provides a water-based pigment ink set comprising at least one or more carbohydrates selected from trehalose, sucrose, glucose, xylose, ribose, mannose, maltodextrin, maltose, lactose, galactose, dextrose, fructose and various synthetic combinations thereof.

The present invention also provides a method for preparing a water-based ink according the invention, comprising the steps of:
i. Preparing a pigment dispersion by mixing a pigment powder together with at least poly(styrene-maleic acid) copolymer and/or poly(styrene-maleamic acid) copolymer as a dispersant, and deionised water, and milling the slurry until the required particle size is obtained; the individual pigment or colourant dispersions can be subjected to milling to provide a dispersion which is stable with pigment particles having an average particle size (Z-average) of between 100 nm and 250 nm, as determined by ISO 13320:2009(E); and
ii. Adding additional water, a carbohydrate, an organic solvent and optionally additional other chemical agents to said dispersions, thereby obtaining water-based inks.

The present invention also provides a method for the decoration of a metal, glass or other rigid and heat stable substrate, by applying a water-based ink according to the invention onto the substrate and fixing the said water-based ink onto said substrate using radiative heat methods.

The present invention also provides a method for printing a variety of different substrates, comprising the steps of:
i. Applying a water-based ink according to the invention onto the substrate; and
ii. Fixation of said water-based ink onto said substrate using NIR-radiation or thermal curing or directed air drying or steaming or a heat press.

The present invention also provides, a decorated substrate that is formed from the deposition of an ink incorporating at least one carbohydrate, whereby said substrate can be printed with at least one or more inks and cured by either a serial arrangement of NIR lamps or thermally cured using a thermal heating device.

According to the present invention, a series of aqueous pigment inks for use in printing onto rigid and flexible substrates can be prepared enabling high line speed digital decoration of said substrates which display colour shift measured by ΔE of 3.0 or less.

As used herein, "high temperatures to ensure the ink films are dry" refers to temperatures ≥120° C., more specifically ≥140° C., ≥160° C., ≥180° C., and most specifically ≥200° C.

Ink Additives

The ink compositions according to the present invention comprise one or more carbohydrates. As will be understood, carbohydrates are also referred to as saccharides, which can be broadly divided into four groups: monosaccharides, disaccharides, oligosaccharides (which typically includes tri- and tetra-saccharides) and polysaccharides.

Preferred carbohydrates in the present invention are mono-, di-, tri- and tetra-saccharides having at least one primary hydroxyl group present within them. Examples of preferred carbohydrates include but are not limited to trehalose, sucrose, glucose, xylose, ribose, mannose, maltodextrin, maltose, lactose, galactose, dextrose, fructose and various synthetic combinations thereof.

Preferably, the carbohydrate used in the present invention is water-soluble, i.e. at least 55 g of carbohydrate dissolves in 100 g of water at 20° C.

Preferably, the carbohydrate used in the present invention is not selected from hydroxypropyl cellulose, carboxymethyl cellulose, hydroxyethyl cellulose, methyl cellulose or starch. Preferably the carbohydrate is not selected from starch or cellulose or derivatives thereof. Preferably, the carbohydrate is not a polysaccharide (including (starch and cellulose and derivatives thereof (such as hydroxypropyl cellulose, carboxymethyl cellulose, hydroxyethyl cellulose, methyl cellulose, etc.)).

Preferably, the carbohydrate is present in an amount of from about 0.1 to about 20 wt % of the composition, preferably from about 0.5 to about 15 wt % of the composition, more preferably from about 1 to about 10 wt % of the composition, even more preferably from about 1 to about 5 wt % of the composition.

The polymeric dispersing agents used in the present invention are copolymers or block copolymers having hydrophilic and hydrophobic functionality incorporated within. The polymeric dispersing agent class in the present invention is advantageously poly(styrene-maleic acid) copolymers and/or poly(styrene-maleamic acid) copolymers (which belong to the same polymeric class).

Preferably, the polymeric dispersant is a poly(styrene-maleamic acid) copolymer. Alternatively, the polymeric dispersant is preferably a combination of poly(styrene-maleic acid) copolymer and poly(styrene-maleamic acid) copolymer.

As will be understood in the art, poly(styrene-maleic acid) co-polymers comprise styrenic and maleic acid repeating units. Similarly, poly(styrene-maleamic acid) co-polymers comprise styrenic and maleamic acid repeating units. As will be further understood in the art, the acidic groups in maleic acid and maleamic acid can form salts with an appropriate neutralizing agent.

Preferably, the maleic acid or maleamic acid repeating unit in the co-polymer is a mono-sodium salt, a di-sodium salt, a mono-ammonium salt, a di-ammonium salt, a mono-quaternary ammonium salt or a di-quaternary ammonium salt.

Preferably, the poly(styrene-maleic acid) copolymer or poly(styrene-maleamic acid) copolymer is selected from a di-sodium salt of poly(styrene-maleic acid) copolymer, a di-ammonium salt of poly(styrene-maleic acid) copolymer, a mono-ammonium salt of poly(styrene-maleamic acid) copolymer, a mono-quaternary ammonium salt of poly(styrene-maleamic acid) copolymer or combinations thereof.

Preferably, the poly(styrene-maleic acid) copolymer and poly(styrene-maleamic acid) copolymer do not contain any maleic anhydride residues.

Preferably, the poly(styrene-maleic acid) copolymer and poly(styrene-maleamic acid) copolymer do not contain any maleic ester residues.

Preferably, the poly(styrene-maleic acid) copolymer and/or poly(maleamic acid) copolymer dispersant is present in an amount of from about 0.1 to about 20 wt % of the composition, preferably from about 0.5 to about 15 wt % of the composition, more preferably from about 1 to about 12 wt % of the composition.

Examples of suitable poly(styrene-maleic acid) copolymers and poly(styrene-maleamic acid) copolymers include, but are not limited to poly(styrene-alt-maleic acid) sodium salt solution from Merck; SMA 1000 H, SMA 1000HNa, SMA 2000H, SMA 2000HNa, SMA 3000H, SMA 3000HNa, SMA 1000 AMP, SMA 2000 AMP and SMA 3000 AMP from Polyscope Polymers. Further examples of suitable poly(styrene-maleic acid) co-polymers and poly (styrene-maleamic acid) co-polymers include Xiran 3000 HNa, Xiran 1000A, Xiran 2000A, Xiran 1550H and Xiran 3000H from Polyscope Polymers.

Preferably, the poly(styrene-maleic acid) copolymers or poly(styrene-maleamic acid) copolymers have a molecular weight of ≥3,000 Daltons, preferable ≥3,500 Daltons. Preferably, the poly(styrene-maleic acid) copolymers or poly (styrene-maleamic acid) copolymers have a molecular weight of 3,000-20,000 Daltons, preferably 3,500-15,000 Daltons.

The poly(styrene-maleic acid) copolymer and/or poly (styrene-maleamic acid) copolymer dispersant can also preferably function as a binder as well as dispersant in the inks according to the present invention. Accordingly, the ink composition preferably contains no other component(s) which perform the function of any one or more of dispersant and binder.

Alternatively, the ink compositions may be inkjet ink compositions that can optionally include one or more additional polymeric binders (i.e. in addition to the poly(styrene-maleic acid) copolymer and/or poly(styrene-maleamic acid) copolymer) that are compatible with the other components of the composition. Binders can be included in the composition to impart any number of desired properties, including, but not limited to, substrate adhesion, stability, smear resistance, viscosity, surface tension, coating penetration, optical density, color depth, adhesion, highlighter resistance, resolubility and crust resistance, among others. Suitable additives for such uses and the amounts of such additives used are known and conventionally used in the art.

Examples of suitable additional binders include, but are not limited to, polyurethane dispersions (PUDs), polyacrylics and PUD-acrylic co-polymers. Examples of commercially available polymeric binders that may also be optionally added to the composition include Lubrijet N240, Carboset 560, PrintRite DP375 and XPD-3276 from Lubrizol; Tego Variplus DS50, Tego Silkopur 8081 from Evonik; Joncryl 90, Joncryl 8055, Joncryl 8050-E, Joncryl ECO 2189-E, Joncryl 8211, Joncryl ECO 2177-E from BASF; UC-84 from Alberdingk Boley; Daotan TW 6450, Daotan 6490, Reshydrol SF 8000, Reshydrol SF 8010, Reshydrol 8011, Daotan TW 7000, Daotan TW 6425, Daotan VTW 6460, Daotan 7225 from Allnex; Optiflo L 1400, Optiflo T 1000 and Optiflo T 1010 from Altana; Phenoxy PKHW 34, Phenoxy PKHW 35 and Phenoxy PKHW 38 from Azelis; Aquazol 5 and Aquazol 50 from Chempoint; Neocryl BT21, Neocryl XK-12, Neorez R-2005, Neorez R-4000, Neocryl A-1127, Neocryl A-1125, Neopac E-200, Neocryl A-1131, Neocryl D-2101 from DSM; EPS 546 and Dyflex LP 9419 from EPS Materials; Hauthane L-2892, Hauthane L-2897, Hauthane HD-4670 and Hauthane L-2183 from C. L. Hauthaway and Sons Inc.; Esajet PU77, Esajet 4518, Esajet AC20, Esajet 200, Esajet 4518, Esajet PU 931, Esajet 5913 from Lamberti; Takelac WS-4022 and Takelac WS-5000 from Mitsui Chemicals; Syntran 3101 from Zschimmer and Schwarz.

The ink compositions may be, but not limited to, inkjet ink compositions that can optionally include one or more additives that are compatible with the other components of the composition. Additives can be included in the composition to impart any number of desired properties, including, but not limited to, stability, smear resistance, viscosity, surface tension, coating penetration, optical density, color depth, adhesion, highlighter resistance, resolubility and crust resistance, among others. Suitable additives for such uses and the amounts of such additives used are known and conventionally used in the art.

Examples of suitable additives include, but are not limited to defoamers, preservatives, surfactants, pH modifiers, viscosity modifiers, humectants, penetrating agents, and additional polymers, among others.

Furthermore, one or more additional dispersant(s) (i.e. in addition to the poly(styrene-maleic acid) or poly(styrene-maleamic acid) copolymer dispersants) may optionally be included in the ink composition if required. Examples of suitable, optional, additional dispersants include, but are not limited to, DisperBYK-190 (an acrylic based resin with polyether side chains available from Altana), Additol XW 6565, Additol XW 6575, Additol XW 330 and Additol XL 6577 (Allnex).

Preferably, defoamers can be included in the ink composition, to inhibit the formation of foam. Examples of suitable defoamers include, but are not limited to, silicone-based or non-silicone defoamers. Commercially available defoamers include, but are not limited to, Dow Corning® 71 and Dow Corning® 74 (from Dow Corning), TegoAirex® 901W, 902W, 904W from Evonik Industries/Tega, Tergitol® L-61, L-62, L-64 and L-101 (from Dow Chemical). A typical amount (by weight) of defoamer included in the composition is 0.1 to 3% by weight.

Preferably, preservatives, such as biocides and fungicides, can be included in the ink composition to inhibit the growth of microorganisms. Examples of suitable preservatives include, but are not limited to, sodium benzoate, pentachlorophenol sodium, 2-pyridinethiol-1-oxide sodium, sodium sorbate, sodium dehydroacetate, benzisothiazolinone, 1,2-dibenzothiazolin-3-one, 1-(3-chlorallyl)-3,5,7-triaza-1 azoniaadamantane chloride (CTAC), methylisothiazolinone, and chloromethylisothiazolinone, among others. Commercially available biocides include UCARCIDE® 250 (available from Union Carbide Company), Proxel® CRL, Proxel® BDN, Proxel® GXL, Proxel® XL-2, Proxel® TN (available from Arch Chemicals, Smyrna, Ga.), Dowicil® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.), and XBINX® (PMC Specialties Group, Inc., Cincinnati, Ohio). The preservatives may be used alone or in combination. A typical amount (by weight) of preservative included in the composition is 0.1 to 1.5% by weight.

Preferably, the ink compositions according to the present invention can include a surfactant and/or a wetting agent. Suitable wetting agents include polyether siloxane co-polymers such as Tego Wet KL 245 (Evonik). Preferably, the wetting agent is present in the composition in 0.1 to 2% by weight. As will be understood in the art, wetting agents lower the interfacial tension of water allowing it to spread on a solid surface.

Preferably, surfactants can be included to reduce surface tension of the ink composition. The surfactant can be an anionic surfactant, non-ionic surfactant or cationic surfactant. Suitable surfactants can include, but are not limited to, those listed below and in U.S. Pat. Nos. 5,116,409, 5,861, 447 and 6,849,111. Exemplary surfactants are commercially available under various trade names, such as the PLURONIC® series (BASF Corporation, Parsippany, N.J.), TETRONIC® series (BASF Corporation, Parsippany, N.J.), ARQUAD® series (Akzo Chemical Inc., Chicago, Ill.), TRITON® series (Union Carbide Corp., Danbury, Conn.), SURFONIC® series (Texaco Chemical Company, Houston, Tex.), ETHOQUAD® series (Akzo Chemical Inc., Chicago, Ill.), ARMEEN® series (Akzo Chemical Inc., Chicago, Ill.), ICONOL® series (BASF Corporation, Parsippany, N.J.), SURFYNOL® series (Air Products and Chemicals, Inc. Allentown, Pa.), and ETHOMEEN® series (Akzo Chemical Inc., Chicago, Ill.), among others. The surfactants can be used alone or in combination. A typical amount (by weight) of surfactant included in the composition is 0.1 to 10% by weight.

Preferably, pH modifiers can be included to adjust or buffer the ink composition to a desired pH. Suitable pH modifiers include, but are not limited to, alkali hydroxides, alkali carbonates and bicarbonates, triethylamine, dimethylethanolamine, triethanolamine, mineral acids, hydrochloric acid, and sulfuric acid, among others. The pH modifiers can be used alone or in combination. A typical amount (by weight) of pH modifier in the composition is 0.1 to 2% by weight.

The ink composition can include one or more viscosity modifiers. Examples of suitable viscosity modifiers include, but are not limited to, resin compounds, alginic acid compounds, polyvinyl alcohol, hydroxypropyl cellulose, carboxymethyl cellulose, hydroxyethyl cellulose, methyl cellulose, salts of polyacrylic acid, polyvinyl pyrrolidone, gum arabic and starch, hydrophobic ethoxylated urethanes (HEURs), hydrophobically modified alkali swellable emulsions (HASEs), alkali swellable emulsions (ASEs), among others. As will be understood, (when present) these optional viscosity modifiers are included in addition to the carbohydrate. The viscosity modifiers can be used alone or in combination. A typical amount (by weight) of viscosity modifier in the composition is 0.5 to 10% by weight.

Preferably, in addition to an organic co-solvent of the fluid carrier component which can function as a humectant, one or more additional humectants can be included in the inkjet ink composition if required to reduce the rate of evaporation of the water component and prevent an ink composition from drying out in the nozzles of the printhead, which can occur during periods of latency, to minimize clogging of the nozzles. Humectants can be selected from materials having high hygroscopicity and water-solubility. Examples of suitable humectants include, but are not limited to, polyols (e.g., glycerol, ethylene glycol), alcohol ethers (e.g., diethylene glycol, triethylene glycol), lactams (e.g., 2-pyrrolidone, urea compounds such as urea, 1,3-dimethylimidazolidinone), saccharides (e.g., sorbitol), 1,4-cyclohexanedimethanol, 1-methyl-2-piperidone, N-ethylacetamide, 3-amino-1,2-propanediol, ethylene carbonate; butyrolacetone and Liponic EG-1, among others. There are no particular limitations on the amount used of the humectant. A typical amount (by weight) of humectant in the composition is 0.5 to 30% by weight.

Preferably, penetrating agents can be included to reduce bleeding of an ink composition when applied to a print substrate such as paper, among others. Examples of suitable penetrating agents include, but are not limited to, alkyl alcohols having 1 to 4 carbon atoms (e.g., ethanol), glycol ethers (e.g., ethylene glycol monomethyl ether), diols (e.g., 1,2-alkyl diols), formamide, acetamide, dimethylsulfoxide, sorbitol and sulfolane, among others. The penetrating agents may be used alone or in combination. A typical amount (by weight) of penetrating agents in the composition is 1 to 20% by weight.

Preferably, the ink composition can optionally include additional polymers (other than the water-soluble poly(styrene-maleic acid) copolymer and/or poly(styrene-maleamic acid) copolymer) to enhance water-fastness, rub and light fastness of an ink image applied to and dried on a print substrate. Examples of such polymers include, but are not limited to, polyvinyl alcohols, polyesters, polyestermelamines, styrene/acrylic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers, and salts thereof, among others. Such additional polymers can be used alone or in combination. A typical amount (by weight) of such additional polymers that can be included in the composition is 0.1 to 20% by weight.

Preferably, the ink composition can optionally include a self-crosslinking polymer to improve the durability of an ink image applied to and dried on a print substrate. Examples of such self-crosslinking polymers for use in the ink compositions include, but are not limited to, self cross-linking acrylic polymers, styrene-acrylic copolymers, styrene-butadiene latexes, styrene-isoprene latexes, acrylonitrile-butadiene latexes, alkyd dispersions, vinyl polymers, silicone dispersions, polyamide dispersions, chlorinated olefin dispersions, and polyester dispersions, among other self-crosslinking polymers. Such self-crosslinking polymers can be used alone or in combination. A typical amount (by weight) of such self-crosslinking polymers that can be included in the composition is 0.1 to 20% by weight.

Other additives that can be included in the ink compositions include, but are not limited to, antioxidants, ultraviolet absorbers, chelating agents, electric conductivity adjusters, oxygen absorbers, anti-kogation agents, anti-curling agents, and fragrances, among others. The amounts of such additives for use in aqueous inkjet ink compositions are known and conventionally used in the art.

Colourants

Suitable colourants that can be used in the ink composition of the invention include inorganic and organic pigments, dyes and lake dispersions. As used herein, a lake pigment of a dye is an organic pigment that has been made by precipitating a water-soluble dye with an inert binder such as a metallic salt.

Pigments refer to colourant particles that are typically water insoluble, i.e. less that 5 g of colourant dissolves in 100 g of water at 20° C.

Suitable pigments that can be used to form the ink compositions disclosed herein may include any organic or inorganic pigment known in the art, including, but not limited to, black, yellow, orange, brown, red, violet, blue, green, fluorescent, metal powder and polymer bond pigments. Pigments also may include, but are not limited to, carbon black, azo pigments, phthalocyanine pigments, anthraquinone pigments, perylene and perynone pigments, polycyclic pigments, naphthol pigments, anthrapyrimidone pigments, quinacridone pigments, anthanthrone pigments, flavanthrone pigments, thioindigo pigments, dioxazine pigments, isoindoline and isoindolinone pigments, quinophthalone pigments, azine pigments, nitroso pigments, nitro pigments, triphenylmethane lake pigments, ovaine lake pigments, metal complex pigments, natural pigments, and inorganic pigments, among others. The pigment particles should be sufficiently small to permit free flow of the ink through the ejecting nozzle of an inkjet printing device.

Suitable coloured pigments can include, for example, yellow pigments such as C. 1. Pigment Yellow 1, 2, 3, 4, 5, 6, 10, 12, 13, 14, 16, 17, 24, 55, 61, 65, 73, 74, 81, 83, 93, 94, 95, 97, 99, 100, 108, 109, 110, 117, 120, 123, 124, 128, 129, 133, 138, 139, 147, 150, 151, 153, 154, 155, 156, 167, 168, 172, 173, 174, 175, 176, 177, 179, 180, 181, 182, 183, 184, 185, 187, 188, 190, 191, 192, 193, and 194 among others; red pigments such as, C. 1. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48, 49, 50, 51, 52, 53, 55, 60, 64, 68, 81, 83, 87, 88, 89, 90, 95, 112, 114, 119, 122, 123, 136, 144, 146, 147, 148, 149, 150, 151, 163, 164, 166, 168, 169, 170, 161, 172, 175, 176, 202, 204, 206, 207, 210, 211, 212, 213, 214, 216, 220, 222, 237, 238, 239, 240, 242, 243, 245, 247, 248, 251, 252, 253, 254, 255, 256, 258, 261, and 264 among others; violet pigments such as C. 1. Pigment Violet 1, 2, 3, 5, 13, 19, 23, 25, 27, 29, 31, 32, 37, 39, 42, 44, and 50 among others; blue pigments such as C. 1. Pigment Blue 1, 2, 3, 9, 10, 14, 15, 16, 18, 19, 21, 22, 24, 25, 56, 60, 61, 62, 63, 64, 65, and 66, among others; orange Apr. 19, 2018 pigments such as C. 1. Pigment Orange 1, 2, 5, 6, 7, 13, 14, 16, 17, 19, 22, 24, 31, 34, 36, 38, 40, 42, 43, 44, 46, 48, 49, 51, 59, 60, 61, 62, 63, 64, 66, 67, 68, and 69 among others; green pigments such as C. 1. Pigment Green 1, 2, 4, 7, 8, 10, 34, 36, 45, and 47, among others; brown pigments such as C. 1. Pigment Brown 1, 2, 3, 5, 22, 23, 25, 26, 32, 38, 41, and 42 among others; black pigments such as C. 1. Pigment Black 1, 7, 20, 31, and 32 among others, and white pigments such as titanium dioxide. Commercially available coloured pigments may include, for example, Pigment Red 122 and Pigment Violet 19 (available from Lansco Colours, Montvale, NJ. or BASF Colour, Charlotte, NC. or Clariant Colours, Charlotte, NC. or Sun Chemical, Cincinnati, Ohio), Pigment Blue 15:1 (available from Fanwood Chemical, Fanwood, N.J.), Pigment Blue 15:3, Pigment 15:4, Pigment Yellow 74 and Pigment Yellow 97 (available from BASF Colour, Charlotte, NC. or Clariant Colours, Charlotte, NC. or Sun Chemical, Cincinnati, Ohio), among others. Other suitable pigments may include, but are not limited to Disperse Blue 14, Disperse Blue 19, Disperse Blue 72, Disperse Blue 334, Disperse Blue 359, Disperse Blue 360, Disperse Orange 25, Disperse Yellow 54, Disperse Yellow 64, Disperse Red 55, Disperse Red 60, Macrolex Red H, Disperse Brown 27, Solvent Blue 67, Solvent Blue 70, Solvent Red 49, Solvent Red 146, Solvent Red 160, Solvent Yellow 162, Solvent Violet 10, and Solvent Black 29, among others.

Suitable pigments can also include carbon black, which is the generic name for carbon particles derived from the thermal decomposition or the incomplete combustion of natural gas and hydrocarbons, such as aromatic oils on coal tar basis, mineral oils, coal tar distillate, and acetylene. More than 100 individual grades of carbon black are available on the market today, each with its own distinctive set of characteristics and properties. Any acidic carbon black, neutral carbon black and alkaline carbon black can be used. This includes channel blacks, gas blacks, lamp blacks, thermal blacks, acetylene blacks and furnace blacks. More particularly, suitable carbon blacks include channel blacks. Examples of commercially available carbon blacks include, but are not limited to, those available from Cabot (Elftex 8, Black Pearls® 490, Black Pearls® 120, Monarch® 120, Monarch® 700, Monarch® 880, Monarch® 1000, Monarch® 1100, Monarch® 1300, Monarch® 1400, Mogul® L, Regal® 99R, Regal® 250R, Regal® 300R, Regal® 330R, Regal® 400R, Regal® 500R, Regal® 660R, Cab-O-Jet® 200, Cab-O-Jet® 300, and Cab-O-Jet® 400), Degussa/Orion Carbon (NlPex® 150 IQ, NlPex® 150, Printex® Printex® 80, Printex® 90, Printex® A, Printex® G, Printex® U, Printex® V, Printex® 140U, Printex® 140V, Purex® LS 35, Corax® HP 160, Thermal Black N 990, NlPex® 160 IQ, Nipex® 1701Q, Nipex® 1801Q, NlPex® 90, Special black 4, Special black 4A, Special black 5, Special black 6, Special black 100, Special black 250, Colour black FW1, Colour black FW2, Colour black FW2V, Colour black FW18, Colour black FW200, Colour black $150, Colour black $160 and Colour black S170), Columbian/Birla Carbon (Raven® 780, Raven® 5000 Ull, Raven® 1255, Raven® 2500 U, Raven® 3600 U, Raven® 3500, Raven® 5000, Raven® 7000, Raven® 1220 and Raven® 1225), Mitsubishi Kagaku K. K. (MA8, MA11, MA77, MA100, MA220, MA230, MA600, MCF88, #10B, #20B, #30, #33, #40, #44, #45, #45L, #50, #55, #95, #260, #900, #970, #1000, #2200B, #2300, #2350, #2400B, #2650, #2700, #4000B and CF9), Orient Chemical Industries Ltd. (Bonjet Black CW-1, US 2018/0105710A1 Bonjet Black CW-2, and Bonjet Black CW-3) and Sensient Technologies (Sensijet® Black SDP100, Sensijet® Black SDP1000, and Sensijet® Black SDP2000.

The pigment can be self-dispersing in a selected continuous phase. Self-dispersing pigments are pigments that do not require an additional dispersant for being stable within a polymer composition. In another embodiment, a self-dispersing pigment is a pigment that has been functionalized with a dispersing agent such as a molecule containing a hydrophilic functional group, for example, by covalent bonding of the molecule to the surface of the pigment.

Preferably, the amount (by weight) of the colourant in the inkjet ink compositions is at least 0.1, such as at least 0.5, at least 1, at least 1.5, and at least 2, % by weight. In embodiments, the amount of the colourant is at most 10, such as at most 9, at most 8, at most 7, at most 6, and at most 5% by weight. This includes embodiments in which the amount of the colourant in the compositions is 0.1 to 10% by weight, such as 2 to 5% by weight.

A colourant used in the inventive inkjet ink compositions can comprise one or more embodiments described herein.

Fluid Carrier

The inkjet ink compositions comprise a fluid carrier which comprises water and one or more organic co-solvents, which can be water-soluble organic co-solvents, water-miscible organic co-solvents, or a combination thereof. The organic co-solvents can be added either alone or in combination.

In another embodiment, the organic co-solvents are humectants, which can reduce the rate of evaporation of the water component and prevent an ink composition from drying out or crusting in the nozzles of the printhead to minimize clogging of the nozzles. In another embodiment, the organic co-solvents can enhance solubility of the components in the inkjet ink composition and facilitate penetration of a printed ink composition into a substrate.

Suitable water-soluble and water-miscible organic solvents include, but are not limited to, alcohols (e.g., methanol, ethanol, propanol, isopropyl alcohol, butanol, polyols, ethylene glycol, propylene glycol, dipropylene glycol, glycerine, and PEG, among others), ketones and ketone alcohols (e.g., acetone and diacetone alcohol, among others), ethers (e.g., tetrahydrofuran, dioxane, and alkylethers, among others), ethers of polyhydric alcohols (e.g., ethylene glycol monomethyl ether, ethylene glycol monoethyl ether, ethylene glycol monoethyl ether acetate, di(ethyleneglycol) monomethyl ether), nitrogen-containing solvents (e.g., 2-pyrrolidone, and N-methyl2-pyrrolidone, among others), sulfur-containing solvents (e.g., 2,2'-thiodiethanol, dimethylsulfoxide, tetramethylene sulfone, and sulfolane, among others), and sugars and derivatives thereof (e.g., glucose, oxyethylene adducts of glycerin, and oxyethylene adducts of diglycerin, among others). Preferably, the organic co-solvent is propylene glycol and/or dipropylene glycol.

The amount (by weight) of the organic co-solvent in the inkjet ink composition is ≥1%, such as ≥5%, ≥1 0% by weight. The amount (by weight) of the organic co-solvent is ≤70%, preferably ≤60% or more preferably ≤50% by weight. This includes embodiments in which the amount of the organic co-solvent in the composition is 1 to 70% by weight, such as 10 to 50% by weight. Preferably, the amount of the organic co-solvent in the ink is 5 to 35% by weight.

An organic co-solvent used in the inventive ink compositions can comprise one or more embodiments described herein.

The inks according to the present invention are water-based. Unless stated otherwise, water-based inks comprise ≥20%, ≥25%, or ≥30% by weight. Preferably, the amount (by weight) of water is ≤95%, ≤85%, ≤80%, ≤75%, ≤70%, ≤65%, or ≤60% by weight. Accordingly, the amount of water in the composition is 20 to 95% by weight, such as 20 to 80, and 20 to 70% by weight. Preferably, the range of water in the composition is typically 30 to 75% by weight, and more preferably 30 to 60% by weight.

Preparation of the Inkjet Ink Compositions

The invention also provides methods of preparing the inkjet ink compositions disclosed herein. The inkjet ink compositions of the invention can be prepared by mixing a dispersion of a pigment in water and poly(styrene-maleic acid) copolymer and/or poly(styrene-maleamic acid) copolymer dispersant with at least one carbohydrate and an organic solvent. The inkjet ink compositions of the invention can also be prepared by mixing a dispersion of a pigment in water and a poly(styrene-maleic acid) copolymer and/or poly(styrene-maleamic acid) copolymer dispersant with at least one carbohydrate, an organic solvent, an additional polymer which can act as a binder and a biocide.

In another embodiment, the inkjet ink composition can also be prepared by mixing a pigment in water and a poly(styrene-maleic acid) copolymer and/or poly(styrene-maleamic acid) copolymer dispersant with at least a carbohydrate, an organic solvent, fluid carrier, an optional cross-linking agent, and optional additives.

The fluid carrier can be prepared by combining one or more water-soluble organic co-solvents, one or more water-miscible organic co-solvents or a mixture thereof, with water, which can be combined with the other components of the composition.

An ink composition according to the invention can comprise a combination of two or more embodiments described herein.

The water-based inks are prepared in the normal manner. A dispersion of the pigment can be prepared in the traditional manner using high shear mixing to form a concentrate pre-mix and then milling. Normally, the carrier liquid, which can be water, or another solvent liquid, is mixed under high shear conditions with a dispersing agent and a wetting agent whilst a powder of the pigment is added. The resulting mixture is typically mixed under high shear conditions for a short time before charging to a bead mill, for example a Netzsch or Buhler mill. The suspension is milled for a fixed time until the desired particle size of the dispersion is reached—typically 100-150 nm (Z-average particle size). At this time, the dispersion is usually discharged from the mill through a filter cartridge into a holding or storage vessel. The dispersions can be made separately, or the two pigments can be combined as powders at the start and essentially co-processed together through the high shear mixing and milling phases.

The ink is prepared in the normal manner for an aqueous pigment ink. To the stirred liquid comprising of water is added the co-solvents, or vice versa. The colourant dispersion(s) are then added slowly, and the other components of the ink are then added—this may be components such as biocides or preservatives, binders, polymers, resins, surfactants, wetting agents and small quantities of other co-solvents. The ink is pumped under positive pressure through a cartridge filter and packed.

Methods of Printing

The invention further includes methods of printing an image on a substrate by applying an inkjet ink composition according to the invention onto the substrate. Preferably, the inkjet ink compositions disclosed herein are adapted for use with an inkjet printing apparatus.

In a preferred method of printing an image according to the invention, droplets of an inkjet ink composition as disclosed herein are ejected from a small nozzle of a printhead and deposited onto a print substrate to generate an image thereon. Suitable inkjet ink printing apparatus can include, but are not limited to, Drop-on-Demand Valve (DoD Valve), MEMS technology and Drop-on-Demand PiezoElectric (DoD Piezo).

Examples of suitable print substrates include, but are not limited to, metal, coated metal, coated glass, uncoated glass, polycarbonate and other heat resistant materials (such as high glass transition temperature plastics, e.g., unplasticized polyvinyl chloride (uPVC)), which are often used in applications such as indirect food contact packaging and automotive applications. Further examples of suitable print substrates include, but are not limited to, high temperature papers and high temperature textiles. Metal substrates used in the present invention may be in the form of metal foils, which typically have a thickness of ≤0.08 mm, preferably ≤0.05 mm.

Further examples of suitable high glass transition temperature plastics (i.e. those having a Tg of ≥120° C.) that may be used in the present invention include, but are not limited to, cellulose diacetate, liquid crystal polymeric films (for example semi-aromatic polyester-co-amides, copolyamides and copolyesters), polyamide imides (PAI), polyarylates, polyether ether ketone (PEEK) and polyimides.

As will be understood in the art, high temperature paper typically refers to papers intended for use in high pressure laminate (HPL) applications or dye transfer papers (also referred to as sublimation papers). Examples of suitable high temperature textiles that can be used in the present invention include, but are not limited to, Kevlar, cotton, polyester, polyester-cotton blends and fire-retardant fabrics.

Suitable metal substrates for the present invention include steel and aluminium.

As will be understood in the art, where the substrate is uncoated the ink is printed directly onto the substrate, i.e. the substrate does not include a chemical primer layer or chemical pre-treatment layer on its surface. As will be understood in the art, a chemical primer layer is an intermediary layer between the substrate and the ink that facilitates adhesion between the substrate and the ink. Similarly, it will be understood in the art that chemical pre-treatment of a substrate involves applying a chemical substance to the substrate before printing which binds to the substrate and which facilitates adhesion between the substrate and the ink.

As will be understood in the art, a chemical primer or chemical pre-treatment is distinct from a physical pre-treatment of the substrate. Accordingly, the uncoated substrate suitable for use in the present invention may be subjected to a physical pre-treatment prior to being printed, for example a plasma pre-treatment. As will also be understood in the art, a chemical primer or chemical pre-treatment for adhesion promotion is distinct from a passivating protective layer on the substrate, for instance for the purpose of corrosion resistance. Accordingly, the uncoated substrate may comprise a passivating protective layer, for instance as is present in protected steel. As is understood in the art, metal substrates are typically protected to prevent corrosion and protection may involve galvanising the metal (e.g. steel) with a layer of a zinc before printing on the substrate.

Alternatively, the substrates that are suitable for use in the present invention may be coated, e.g. coated glass or coated metal. For example, substrates may be coated with a white primer and/or clearcoat covering.

The inkjet ink compositions are formulated to have properties that allow for at least one of the following: 1) uniform prints which display no more than a ΔE of 3.0 when the heat-treated prints are cured (compared to the pre-heat treated colour); 2) uniform, bleed-free print images with high resolution and high density on a print substrate; 3) inhibition or prevention of nozzle clogging which typically occurs due to drying of the ink at a distal end of a nozzle of the printing apparatus; 4) rapid drying on a print substrate; 5) long-term storage stability; and 6) print characteristics that are independent of the print substrate quality. The inkjet ink compositions can also provide ink stability and robustness against fluctuating temperature conditions which can occur during transport and storage, to eliminate or inhibit nozzle clogging, banding, and poor print quality.

In another embodiment, the inkjet ink compositions disclosed herein can be adapted specifically for use in rigid and heat-stable articles and associated printing processes. As will be understood in the printing art, articles are typically defined as rigid if they do not warp or crease at ambient temperature (i.e. 20° C.) with no external applied force, for example an aluminium drink container. As will be further understood in the art, articles are typically defined as heat-stable if there is no deformation or wrapping at the temperature required to cure the ink, for example a polyester textile. The inkjet ink compositions adapted for inkjet printing can be formulated to have at least one of the following properties: 1) adhesion to substrates, particularly metal, glass, polycarbonate and coated metals or blends thereof; 2) ease of application and fixation to the substrates.

The inks described in this invention are preferably suitable for use on industrial high-speed digital printing presses for the decoration of metal, coated metal, glass, polycarbonate and other substrates (for example, heat resistant plastic films). Following printing of the inks on a substrate on a digital press, often at high line speeds, the combination of one or more of the inks from the series results in tack free films. The substrates are then heat-treated at relatively high temperatures (e.g. ≥120° C., in some cases ≥140° C., or ≥160° C., or ≥180° C., or even in some cases ≥200° C.) and surprisingly exhibit reduced colour shift as measured by the ΔE which is considered a pass when it is ≤3.0.

Measurement Methods

Acid Value (AV): Acid value (or acid number) is defined as the mass of potassium hydroxide (KOH) in milligrams that is required to neutralize one gram of chemical substance. The acid value is suitably measured in accordance with the ISO 2114:2000(E)(method B) standard.

Particle Size/Average Particle Size: Unless stated otherwise, the terms "particle size" or "average particle size" refer to the Z-average i.e. the harmonic mean from the intensity-weighted distribution as measured by dynamic light scattering (DLS), as defined in ISO 22412:2008.

Nanoscale: In the context of the invention this refers to a particle having one dimension of less than 100 nm, a commonly accepted definition of a nanoparticle.

Glass Transition Temperature (Tg): Tg is measured by differential scanning calorimetry (DSC). Preferably, measurements were made according to the following standard test method and based on the method described in ASTM E1356-98. The sample was maintained under an atmosphere of dry nitrogen for the duration of the scan. A flow rate of 20 ml/min and Al pans were used. Samples (5 mg) were heated at 20° C./min from 20° C. to 350° C. The value of a Tg was determined as the extrapolated onset temperature of the glass transition observed on the DSC scans (heat flow (W/g) against temperature (° C.)), as described in ASTM E1356-98.

Molecular Weight: The terms "molecular weight" or "average molecular weight" is a reference to the weight average molecular weight (Mw). The molecular weight is suitably measured by techniques known in the art such as gel permeation chromatography. Preferably, molecular weight is measured by comparison with a polystyrene standard. For instance, molecular weight determination may be conducted on a Hewlett-Packard 1050 Series HPLC system equipped with two GPC Ultrastyragel columns, 103 and 104 Å (5 µm mixed, 300 mm×19 mm, Waters Millipore Corporation, Milford, MA, USA) and THF as mobile phase. The skilled person will appreciate that this definition of molecular weight applies to polymeric materials which typically have a molecular weight distribution.

Unless stated otherwise, the viscosities of the inks were measured using a Brookfield DV-II+ Pro Viscometer equipped with an Enhanced Brookfield UL Adapter at 60 rpm and 25° C.

Unless stated otherwise, pH and conductivity were measured at 25° C. using an Oakton 510 series pH/conductivity meter.

Unless stated otherwise, dynamic surface tension is measured using a SITA bubble pressure tensiometer at 25° C. and 2.7 Hz and static surface temperature is measure using a SITA bubble pressure tensiometer at 25° C. and a bubble frequency of 0.025 Hz.

The invention is further described by the following numbered paragraphs:

1. A printing method comprising
   (a) printing one or more layers of ink by inkjet deposition onto a substrate; and
   (b) curing the one or more ink layers at a temperature ≥120° C., more preferably ≥140° C., more preferably ≥160° C., more preferably ≥180° C., most preferably ≥200° C.;
   wherein the inkjet inks comprise one or more carbohydrates, water and one or more organic solvents; and wherein the inkjet inks exhibit ΔE colour change of ≤3.00 after curing.
2. The method of paragraph 1, wherein the ink further comprises a dispersant.
3. The method of paragraph 2, wherein the dispersant is in the form of a polymer.
4. The method of paragraph 2, wherein the dispersant is in the form of co-polymer or block co-polymer having hydrophilic and hydrophobic functionality.
5. The method of paragraph 2, wherein the dispersant is a poly(styrene-maleic acid) co-polymer.
6. The method of paragraph 1, wherein at least a portion of the one or more carbohydrates is a mono-, di-, tri- or tetra-saccharide having at least one free primary hydroxyl group.

7. The method of any preceding paragraph, wherein the carbohydrates are water soluble.
8. The method of any preceding paragraph, wherein at least a portion of the one or more carbohydrates has the structure where the primary hydroxyl groups are in the range of 1-10, more preferably 1-5 and even more preferably 1-4.
9. The method of any preceding paragraph, wherein the carbohydrates are selected from the group consisting of trehalose, sucrose, glucose, xylose, ribose, mannose, maltodextrin, maltose, lactose, galactose, dextrose, fructose and various synthetic combinations thereof.
10. The method of any preceding paragraph, wherein the inks comprise 0.1-15 wt % of a pigment; 0.1-20 wt % of a carbohydrate; 0.1-20 wt % of a polymer which can be classed as a dispersant; 0.1-30 wt % of an organic solvent; and the remainder of the formulation being deionised water.
11. The method of any preceding paragraph, wherein the colourant in the one or more inks is selected from the group consisting of organic pigment, inorganic pigment, the lake pigment of a dye and combinations thereof.
12. The method of any preceding paragraph, wherein the one or more inks further comprise at least one additional polymer.
13. The method of paragraph 12, wherein the at least one additional polymer is selected from the group consisting of polyurethane dispersions, polyvinyl alcohols, polyesters, polyestermelamines, styrene/acrylic acid copolymers, styrene/maleic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers, and salts thereof and blends thereof.
14. The method of any preceding paragraph, wherein the one or more inks further comprise a pH modifier or a surfactant.
15. The method of any preceding paragraph, wherein the substrate is selected from the group consisting of metal, glass, coated metal, coated glass, metal foils, coated metal foils, high temperature papers and high temperature textiles (such as polyester-cotton).
16. The method of any preceding paragraph, wherein the one or more inks are cured using a near infrared (NIR) lamp or infrared lamp.
17. The method of any preceding paragraph, wherein the one or more inks are cured using, wherein the one or more inks are cured using an airflow method.
18. The method of any preceding paragraph, wherein the inkjet deposition is selected from the group consisting of thermal, drop-on-demand, continuous or MEMs.
19. The method of any preceding paragraph, wherein the one or more inks have a static surface tension of <40 dyne/cm, more preferably <36 dyne/cm and even more preferably <35 dyne/cm.
20. The method of any preceding paragraph, wherein the one or more inks have a dynamic surface tension of <47 dyne/cm at 2.7 Hz, more preferably <42 dyne/cm and even more preferably <40 dyne/cm.
21. A printed substrate resulting from the method of any one or more of paragraphs 1-21.
22. The printed substrate of paragraph 22, which is suitable for food, pharmaceutical, cosmetic and indirect food contact applications.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The invention is further described by the following non-limiting examples which further illustrate the invention, and are not intended, nor should they be interpreted to, limit the scope of the invention.

Example 1: Cyan Dispersion and Inks

1a. Cyan Dispersion (3.69% poly(styrene-maleic acid) polymer solids): To a stirring tank or vessel is added 44.98 kg of deionised water (conductivity less than 25 microSiemens) and 14.74 kg of Xiran 3000 HNa solution (poly (styrene-maleic acid) in water at 25% polymer solids, acid number 255-305 mg KOH/g and molecular weight 10 kD) and the two components mixed using stirring for a few minutes. Agitan 731 biocide (0.15 kg) and Acticide M10 biocide (0.07 kg) are then added with continual stirring of the mixture. The pigment powder, Heliogen Blue D 7086, 14.74 kg is then added slowly to the tank with continued stirring. The resulting mixture is stirred for 45 minutes and then mixed under high shear for a further 60 minutes. The mixture is then pumped into a MMP3 bead mill (Buhler) and the process of milling is started. After four hours, the milling is deemed complete and the dispersion is returned to a stirring tank and 25.32 kg of deionised water is added. After mixing for a few minutes, the dispersion is pumped through a 1-micron depth filter (absolute) and stored. The physical properties of the dispersion were measured to give a viscosity of 3.40 cP (measured at 25° C. at low shear (i.e. at 60 rpm) using a ThermoHaake Rheostress 1); pH 10.0 (measured at 25° C. using an WTW pH-Electrode Sen Tix 81); conductivity 3.0 mScm-1 (measured at 25° C. using a WTW Tetra-Con 325); particle size Z-average 128 nm (measured using a Malvern Zetasizer Nano-ZS); pigment solids content 14.70% w/w (measured using a Shimadzu UV-Vis recording Spectrophotometer—UV-2501 PC).

1b. Cyan Ink Set 1 (comparative ink, no additional carbohydrate types added): To a stirring tank or vessel using a saw tooth impellar is added 23.7 g of the cyan dispersion (Example 1a); followed by deionised water, 4.3 g; Xiran 3000H (Polyscope; 25% (poly(styrene-maleamic acid) solution in water, acid number 255-305 mg KOH/g and molecular weight 10 kD), 40.0 g, propylene glycol, 26.0 g; dipropylene glycol, 5.0 g; and finally Tego Wet KL 245, 1.0 g. The mixture was stirred for a further 1 hour at ambient temperature and then the mixture filtered through a 1-micron absolute polypropylene spun depth filter.

1c. Cyan Ink Set 2 (inventive ink, 1.96% additional carbohydrate added): To a stirring tank or vessel using a saw tooth impellar is added 23.7 g of the cyan dispersion (Example 1a); followed by deionised water, 4.3 g, Xiran 3000H (Polyscope; (25% poly(styrene-maleamic acid solution in water, acid number 255-305 mg KOH/g and molecular weight 10 kD), 40.0 g; propylene glycol, 26.0 g; dipropylene glycol, 5.0 g; Trehalose 2.0 g and finally Tego Wet KL 245, 1.0 g. The mixture was stirred for a further 1 hour at ambient temperature and then the mixture filtered through a 1-micron absolute polypropylene spun depth filter.

Example 2: Magenta Dispersion and Inks

2a. Dispersion (4.25% poly(styrene-maleic acid) polymer solids): To a stirring tank or vessel is added 51.75 kg of deionised water (conductivity less than 25 microSiemens) and 17.00 kg of Xiran 3000 HNa solution (poly(styrene-maleic acid) in water at 25% polymer solids, acid number 255-305 mg KOH/g and molecular weight 10 kD) and the two components mixing using stirring for a few minutes. Agitan 731 biocide (0.17 kg) and Acticide M10 biocide (0.09 kg) are then added with continual stirring of the mixture. The pigment powder, Cinquasia Pink K 4430 FP, 17.00 kg is then added slowly to the tank with continued stirring. The resulting mixture is stirred for 45 minutes and then mixed under high shear for a further 60 minutes. The mixture is then pumped into a MMP3 bead mill (Buhler) and the process of milling is started. After four hours, the milling is deemed complete and the dispersion is returned to a stirring tank and 13.99 kg of deionised water is added. After mixing for a few minutes, the dispersion is pumped through a 1-micron depth filter (absolute) and stored. The physical properties of the dispersion were measured to give a viscosity of 3.60 cP (measured at 25° C. at low shear (i.e. at 60 rpm) using a ThermoHaake Rheostress 1); pH 9.9 (measured at 25° C. using a WTW pH-Electrode Sen Tix 81); conductivity 3.3 mScm-1 (measured at 25° C. WTW Tetra-Con 325); particle size Z-average 127 nm (measured using a Malvern Zetasizer Nano-ZS); pigment solids content 17.0% w/w (measured using a Shimadzu UV-Vis recording Spectrophotometer—UV-2501 PC).

2b. Magenta Ink Set 1 (comparative ink, no additional carbohydrate types added): To a stirring tank or vessel using a saw tooth impellar is added 31.6 kg of the magenta dispersion (Example 2a); followed by deionised water, 26.3 kg; propylene glycol, 34.6 kg; dipropylene glycol, 6.7 kg; and finally Tego Wet KL 245, 0.8 kg. The mixture was stirred for a further 1 hour at ambient temperature and then the mixture filtered through a 1-micron absolute polypropylene spun depth filter.

2c. Magenta Ink Set 2 (inventive ink, 1.96% additional carbohydrate added): To a stirring tank or vessel using a saw tooth impellar is added 29.6 kg of the magenta dispersion (Example 2a); followed by deionised water, 24.6 kg; propylene glycol, 32.55 kg; dipropylene glycol, 6.25 kg; Xiran 3000H, 6.25 kg (poly(styrene-maleic acid) 25% solution in water); Trehalose 2.0 kg and finally Tego Wet KL 245, 0.75 kg. The mixture was stirred for a further 1 hour at ambient temperature and then the mixture filtered through a 1-micron absolute polypropylene spun depth filter.

Example 3: Yellow Dispersion and Inks

3a. Dispersion: To a stirring tank or vessel is added 51.63 kg of deionised water (conductivity less than 25 microSiemens) and 7.41 kg of Fluij et 1730 solution and the two components mixing using stirring for a few minutes. Agitan 731 antifoam (0.15 kg) and Acticide M10 biocide (0.07 kg) are then added with continual stirring of the mixture. The pigment powder, Irgazin Yellow L 2040, 14.80 kg is then added slowly to the tank with continued stirring. The resulting mixture is stirred for 45 minutes and then mixed under high shear for a further 60 minutes. The mixture is then pumped into a MMP3 bead mill (Buhler) and the process of milling is started. After four hours, the milling is deemed complete and the dispersion is returned to a stirring tank and 25.93 kg of deionised water is added. After mixing for a few minutes, the dispersion is pumped through a 1-micron pleated filter and stored. The physical properties of the dispersion were measured to give a viscosity of 5.00 cP (measured at 23° C. at low shear (i.e. at 60 rpm) using a ThermoHaake Rheostress 1); pH 6.6 (measured at 25° C. using a WTW pH-Electrode Sen Tix 81); conductivity 2.0 mScm-1 (measured at 25° C. WTW Tetra-Con 325); particle size Z-average 140 nm (measured using a Malvern Zetasizer Nano-ZS); pigment solids content 14.8% w/w (measured using a Moisture Analyzer or a Shimadzu UV-Vis recording Spectrophotometer—UV-2501 PC).

3b. Yellow Ink Set 1 (comparative ink, no additional carbohydrate types added): To a stirring tank or vessel using a saw tooth impellar is added 23.7 g of the yellow dispersion (Example 3a); followed by deionised water, 4.3 g; Xiran 3000H (Polyscope; 25% poly(styrene-maleamic acid solution in water, acid number 255-305 mg KOH/g and molecular weight 10 kD), 40.0 g, propylene glycol, 26.0 g; dipropylene glycol, 5.0 g; and finally Tego Wet KL 245, 1.0 g. The mixture was stirred for a further 1 hour at ambient temperature and then the mixture filtered through a 1-micron absolute polypropylene spun depth filter 3c. Yellow Ink Set 2 (inventive ink, 1.96% additional carbohydrate added): To a stirring tank or vessel using a saw tooth impellar is added 23.7 g of the yellow dispersion (Example 3a); followed by deionised water, 4.3 g; Xiran 3000H (Polyscope; 25% poly(styrene-maleamic acid solution in water, acid number 255-305 mg KOH/g and molecular weight 10 kD), 40.0 g, propylene glycol, 26.0 g; dipropylene glycol, 5.0 g; trehalose, 2.0 g; and finally Tego Wet KL 245, 1.0 g. The mixture was stirred for a further 1 hour at ambient temperature and then the mixture filtered through a 1-micron absolute polypropylene spun depth filter.

Example 4: Black Dispersion and Ink

4a. Dispersion (3.5% poly(styrene-maleic acid) polymer solids): To a stirring tank or vessel is added 41.79 kg of deionised water (conductivity less than 25 microSiemens), and 14.00 kg of Xiran 3000 HNa solution (poly(styrene-maleic acid) in water at 25% polymer solids, acid number 255-305 mg KOH/g and molecular weight 10 kD) and the two components mixing using stirring for a few minutes. Agitan 731 biocide (0.14 kg) and Acticide M10 biocide (0.07 kg) are then added with continual stirring of the mixture. The pigment powder, Raven FC1, 14.00 kg is then added slowly to the tank with continued stirring. The resulting mixture is stirred for 45 minutes and then mixed under high shear for a further 60 minutes. The mixture is then pumped into a MMP3 bead mill (Buhler) and the process of milling is started. After four hours, the milling is deemed complete and the dispersion is returned to a stirring tank and 30.0 kg of deionised water is added. After mixing for a few minutes, the dispersion is pumped through a 1-micron depth filter (absolute) and stored. The physical properties of the dispersion were measured to give a viscosity of 3.50 cP (measured at 25° C. at low shear (i.e. at 60 rpm) using a ThermoHaake Rheostress 1); pH 9.0 (measured at 25° C. using a WTW pH-Electrode Sen Tix 81); conductivity 3.8 mScm$^{-1}$ (measured at 25° C. WTW Tetra-Con 325); particle size Z-average 140 nm (measured using a Malvern Zetasizer Nano-ZS); pigment solids content 14.0% w/w (measured using a Shimadzu UV-Vis recording Spectrophotometer—UV-2501 PC).

4b. Black Ink Set 1 (comparative ink, no additional carbohydrate types added): To a stirring tank or vessel using a saw tooth impellar is added 31.6 kg of the black dispersion (Example 4a); followed by deionised water, 26.3 kg; propylene glycol, 34.6 kg; dipropylene glycol, 6.7 kg; and finally Tego Wet KL 245, 0.8 kg. The mixture was stirred for a further 1 hour at ambient temperature and then the mixture filtered through a 1-micron absolute polypropylene spun depth filter.

4c. Black Ink Set 2 (inventive ink, 1.96% additional carbohydrate added): To a stirring tank or vessel using a saw tooth impellar is added 29.6 kg of the black dispersion (Example 4a); followed by deionised water, 24.6 kg; propylene glycol, 32.55 kg; dipropylene glycol, 6.25 kg; Xiran 3000H, 6.25 kg ((poly(styrene-maleic acid) 25% solution in water); Trehalose, 2.0 kg and finally Tego Wet KL 245, 0.75 kg. The mixture was stirred for a further 1 hour at ambient temperature and then the mixture filtered through a 1-micron absolute polypropylene spun depth filter.

All of the inventive Examples 1b-1c; 2b-c; 3b-c; and 4b-c inks were tested for the following properties to show their suitability for use as inkjet inks:

1. Printing/Curing—Example 1b-1c; 2b-c; 3b-c; and 4b-c inks were printed using either a Dimatix DMP2800 printer, or industrial printing presses equipped with either Kyocera KJ4B or Konica Minolta 1024 print heads. All of the printed examples were independently either (a) dried at 40° C. in a convection fan oven for 30 minutes; (b) heat-dried at 110° C. for 2 minutes followed by curing at 210° C. for 10 minutes; or (c) cured using NIR lamps from Adphos at a 3 kW setting. All printed examples were evaluated visually and demonstrated excellent line straightness, good uniform colour density, no edge bleeding and minimal dot gain, and thus deemed to exhibit good jetting and printability properties. Substrates tested were uncoated glass and protected steel. The results obtained were similar to the comparative inks which did not contain any additional carbohydrates.

2. Coating/Curing—Example 1b-1c; 2b-c; 3b-c; and 4b-c inks were coated onto substrates. The ink is applied to the substrate using a 12-micron No. 2 K-bar (also known as a wire bar coater) and the coated examples were independently either (a) dried at 40° C. in a convection fan oven for 30 minutes; (b) heat-dried at 110° C. for 2 minutes followed by curing at 210° C. for 10 minutes; or (c) cured using NIR lamps from Adphos at a 3 kW setting. All coated examples were evaluated visually and demonstrated good surface wetting and coating, as displayed by no pooling or non-wetting, excellent uniform colour density, no edge effects and thus were deemed to exhibit excellent coating properties. Substrates tested were glass microscope slide (i.e. uncoated glass) and protected steel. The results obtained were equal to the comparative inks which did not contain any additional carbohydrates.

3. Resolubility (Examples 1b-1c; 2b-c; 3b-c; 4b-c inks)—A sample of each of the Example 1b-1c; 2b-c; 3b-c; 4b-c inks were coated on to an uncoated glass microscope slide (Fisher Scientific) using a 50-micron No. 5 K-bar (also known as a wire bar coater) and the film dried at 40° C. for 30 minutes in a fan convection oven. Subsequently, the printed substrate was partially immersed in a beaker containing flush (inkjet flush liquid) and the time taken for the ink to resolubilize from the substrate was recorded. For this test, the time to resolubilize is preferably ≤2 hours, more preferably ≤1 hour, more preferably ≤30 min., most preferably ≤10 min. In all cases, the inks resolubilized in ≤1 minute, which is an excellent result. This test is an accurate representation of what might happen to an inkjet print head if it is not capped correctly and is left for a long period of time with the end result being the ink drying in the print head or the machine. The expectation is that the ink should be resolubilized as quickly as possible with no visible or lasting damage to the print head or machine. The inventive inks containing carbohydrates showed improvement vs. the comparative (without carbohydrates) in that the inventive inks exhibited shorter time to resolubilize (Table 4).

4. Storage stability—All of the Example 1b-1c; 2b-c; 3b-c; and 4b-c inks were tested for storage stability by storing the ink samples in glass vials (30 mL) for periods of time at 50° C. The physical properties listed in the examples were measured on a weekly basis. If one of the parameters from viscosity, filter time, surface tension, pH or conductivity has changed by more than +/−10% over the course of 2 weeks, then the ink is deemed to have failed. Example 1b-1c; 2b-c; 3b-c; and 4b-c inks all showed acceptable stability (no change of +1-10% for the aforementioned properties) after two weeks at 50° C. This equates to a product shelf-life of approximately 16 weeks at normal storage conditions (15-30° C.). These results indicate that the inventive inks containing carbohydrates displayed similar stability as the comparative inks which did not contain any additional carbohydrates.

5. Open time—An 8 mL Dimatix DoD ink cartridge was filled by syringe and loaded onto the Dimatix DMP2800 printer. The ink was left in the cartridge for at least one hour and then the printer re-started. For the ink to pass, a fully printed image was expected to appear. Indeed, with all of the Example 1b-1c; 2b-c; 3b-c; and 4b-c inks, this was the case. Further, the open time was tested on Kyocera KJ4B and Konica Minolta 1024 print heads for all of the 1b-1c; 2b-c; 3b-c; and 4b-c inks and found to be in excess of 1 hour. For this test standard photographic quality A4 inkjet paper was used. These results indicate that the inventive inks containing carbohydrates displayed similar open times as the comparative inks which did not contain any additional carbohydrates.

6. Cross hatch and crock test (adhesion and bend) on coated and printed samples—Testing was performed on coated steel substrate (white primer layer and clearcoat covering). The ink is applied to the substrate using either i) a 12-micron No. 2 K-bar (also known as a wire bar coater) or ii) inkjet printing. The inkjet printed film is applied to the substrate using a Dimatix DMP 2800 inkjet printer, using the K15 waveform. Drop size on the printer was 10 picolitres, with a cartridge temperature of 32° C., a meniscus setpoint of 4 inches of water, a drop spacing of 26 microns, from a DMC-11610 Dimatix print cartridge. A solid block of ink was inkjet printed in a 45 mm×45 mm block, with the cartridge aligned at 7 degrees to the direction of travel, a maximum jetting frequency of 2 kHz and a throw distance of 2-3 mm from the substrate. The resulting films are then dried at 110° C. for 2 minutes in fan oven. The sample is tested for scratch resistance using a fingernail. If no ink coating is visually removed, then the coating is a pass. The film is then cured in a convection oven for 10 minutes at 210° C. to ensure a full cure on a metal substrate. The bend test involves bending the substrate through 180 degrees and checking if there is any visible damage to the dried film by eye. If there is no damage, it is a pass. A cross-hatch test is then performed by using a scribe cross hatch (10×10 cross hatch). The print surface is wiped with a low friction contact brush and a strip of Elcometer 99 tape is applied to the crosshatch area and rubbed several times under pressure to ensure the tape is adhered to the surface. The tape end is bent over by 180 degrees and the tape end pulled to establish if any of the coating is removed. If any coating is removed, this is a fail. The films are also swabbed with deionized water up to 100 times by manual contact swabbing. A pass is at least 100 wipes. All of the Example 1b-1c; 2b-c; 3b-c; and 4b-c inks passed. These results indicate that the inventive inks containing carbohydrates displayed similar cross hatch and crock testing performance as the comparative inks which did not contain any additional carbohydrates.

7. Colour Shift on coated samples—Testing was performed on coated steel substrate (white primer layer and clearcoat covering). The ink is applied to the substrate using either a 12-micron No. 2 K-bar (also known as a wire bar coater) and the film dried at 110° C. for 2 minutes in fan oven. The dried film is them measured for colour using an X-Rite i7 spectrometer (using a template "Textile Reflectance 10 mm Template"). The data measured were the mean L, a* and b* values from four independent readings of each coated substrate. The film is then cured in a convection oven for 10 minutes at 210° C. to ensure a full cure on the metal substrate. The cured film is them measured for colour using an X-Rite i7 spectrometer (using a template "Textile Reflectance Template"). The data measured were the mean L, a* and b* values from four independent readings of each coated substrate. The difference between the mean dried colour parameters (L, a*, b*) and the mean cured colour parameters (L, a*, b*) are then calculated and reported. The inks containing carbohydrates exhibited a significant and acceptable ($\Delta E \leq$ than 3.0) colour shift performance after heat curing vs. the comparative inks which did not contain carbohydrates (Tables 1 & 2)

8. Colour Shift on printed samples—Testing was performed on coated steel substrate (white primer layer and clearcoat covering). The ink is applied to the substrate using a Dimatix DMP 2800 inkjet printer, using the K15 waveform. Drop size on the printer was 10 picolitres, with a cartridge temperature of 32° C., a meniscus setpoint of 4 inches of water, a drop spacing of 26 microns, from a DMC-11610 Dimatix print cartridge. A solid block of ink was inkjet printed in a 45 mm×45 mm block, with the cartridge aligned at 7 degrees to the direction of travel, a maximum jetting frequency of 2 kHz and a throw distance of 2-3 mm from the substrate. The inkjet printed films were then dried at 110° C. for 2 minutes in fan oven. The dried film is then measured for colour using an X-Rite i7 spectrometer (using a template "Textile Reflectance Template"). The data measured were the mean L, a* and b* values from four independent readings of each coated substrate. The film is then cured in a convection oven for 10 minutes at 210° C. to ensure a full cure on the metal substrate. The cured film is them measured for colour using an X-Rite i7 spectrometer (using a template "Textile Reflectance 10 mm Template"). The data measured were the mean L, a* and b* values from four independent readings of each coated substrate. The difference between the mean dried colour parameters (L, a*, b*) and the mean cured colour parameters (L, a*, b*) are then calculated and reported. The inks containing carbohydrates exhibited a significant and acceptable ($\Delta E \leq$ than 3.0) colour shift performance after heat curing vs. the comparative inks which did not contain carbohydrates (Table 3).

Definitions

Good jetting and printed image quality is defined as adequate drop formation when ejected from a digital inkjet head at different drop volumes. There should be no satellites or drop break up which can be detrimental to the printed image quality, usually verified by jet testing on a drop watcher machine such as those from X-Rite. Good printed image quality is defined as the image being compliant with the end use application. Usually verified using a series of tests such as line straightness, wicking, feathering, dot gain, etc. on an ImageXpert from Xrite.

Storage stability is the number of days, weeks or months that an ink can be stored without any significant settling or degradation which may lead to poorer performance of the inks.

Open time is the time by which a print head can be left uncapped (hence open) and then when jetting is recommenced, a complete start-up of all nozzles. Normal open times are at least one hour.

Resolubility is defined as the time taken to resolubilise ink which has air dried in a digital print head or press due to poor maintenance or downtime. The expectation is that when using a standard flush, cleaning or maintenance liquid, the ink is resolubilised in less than 10 minutes, thus enabling blocked nozzles to be recovered.

Data measured on draw down samples on metal substrates, prepared as described above can be found in the tables below. These clearly demonstrate that by including small amounts of a carbohydrate in the inks, such as trehalose, the colour shift on thermal cure can be significantly reduced to a level which is acceptable in the industry, namely $\Delta E$ is less than 3.0.

TABLE 1

Cyan Ink Sets 1b and 1c: colour data and resistance properties on drawdowns

| Example | $\Delta E$ Colour Shift | film scratched off by fingernail | | Film cracked during bend test | Film cracked after curing | number of water double rubs after curing |
| --- | --- | --- | --- | --- | --- | --- |
| | | before curing | after curing | | | |
| Cyan Ink Set 1b (comp.) | 4.80 | yes | no | no | no | >100 |
| Cyan Ink Set 1c (inv.) | 1.71 | yes | no | no | no | >100 |

The data in Table 1 shows that the inventive inks have similar resistance properties as the comparative inks, while exhibiting far less ΔE colour shift after heat curing.

TABLE 2

Yellow Ink Sets 3b and 3c: colour data and resistance properties on drawdowns

| Example | ΔE Colour Shift | film scratched off by fingernail | | Film cracked during bend test | Film cracked after curing | number of water double rubs after curing |
| --- | --- | --- | --- | --- | --- | --- |
| | | before curing | after curing | | | |
| Yellow Ink Set 3b (comp.) | 3.75 | yes | no | no | no | >100 |
| Yellow Ink Set 3c (inv.) | 2.97 | yes | no | no | no | >100 |

The data in Table 2 shows that the inventive inks have similar resistance properties as the comparative inks, while exhibiting far less ΔE colour shift after heat curing.

TABLE 3

Cyan Ink Sets 1b and 1c: colour data and resistance properties on inkjet prints

| Example | ΔE Colour Shift | film scratched off by fingernail | | Film cracked after curing |
| --- | --- | --- | --- | --- |
| | | before curing | after curing | |
| Cyan Ink Set 1b (comp.) | 4.45 | yes | no | no |
| Cyan Ink Set 1c (inv.) | 1.46 | yes | no | no |

The data in Table 3 shows that the inventive inks have similar resistance properties as the comparative inks, while exhibiting far less ΔE colour shift after heat curing.

TABLE 4

Resolubility data

| Example | Resolubility time | Comments |
| --- | --- | --- |
| Cyan Ink Set 1b (Comp.) | 22 minutes | Control ink with no added carbohydrate |
| Cyan Ink Set 1c (Inv.) | 17 minutes | Experimental ink w/~1.96% w/w trehalose |
| Yellow Ink Set 3b (Comp.) | 26 minutes | Control ink with no added carbohydrate |
| Yellow Ink Set 3c (Inv.) | 17 minutes | Experimental ink w/~1.96% w/w trehalose |

The data in Table 5 exhibits the improved (faster) resolubility for the inventive inks vs. comparative.

The invention claimed is:

1. An inkjet ink composition comprising:
a pigment colourant, a polymeric dispersant, a carbohydrate, water and an organic co-solvent,
wherein the polymeric dispersant is selected from a poly(styrene-maleic acid) copolymer, a poly(styrene-maleamic acid) copolymer or a combination thereof,
wherein the poly(styrene-maleic acid) copolymer and poly(styrene-maleamic acid) copolymer do not contain any maleic anhydride residues, and
wherein the poly(styrene-maleic acid) copolymer and/or poly(styrene-maleamic acid) copolymer dispersant has an acid number of ≥255 mg KOH/g.

2. The ink composition according claim 1, wherein the poly(styrene-maleic acid) copolymer and/or poly(styrene-maleamic acid) copolymer dispersant has an acid number of 255-550 mg KOH/g.

3. The ink composition according to claim 2, wherein the poly(styrene-maleic acid) copolymer and/or poly(styrene-maleamic acid) copolymer dispersant has a molecular weight of 3,000-20,000 Daltons.

4. The ink composition according to claim 3, wherein the poly(styrene-maleic acid) copolymer and/or poly(styrene-maleamic acid) copolymer dispersant is a salt and the counter-ion is selected from the group consisting of lithium, sodium, potassium, ammonium and quaternary ammonium salt of an organic amine.

5. The ink composition according to claim 4, wherein the poly(styrene-maleic acid) copolymer and/or poly(styrene-maleamic acid) copolymer dispersant is a mono-sodium salt, a di-sodium salt, a mono-ammonium salt, a di-ammonium salt, a mono-quaternary ammonium salt of an organic amine or a di-quaternary ammonium salt of an organic amine.

6. The ink composition according to claim 4, wherein the organic amine of the quaternary ammonium salt of an organic amine is selected from the group consisting of primary, secondary and tertiary aliphatic amines, hydroxylamines, alkoxyl amines, and combinations thereof.

7. The ink composition according to claim 5, wherein the carbohydrate is selected from the group consisting of trehalose, sucrose, glucose, xylose, ribose, mannose, maltodextrin, maltose, lactose, galactose, dextrose, fructose and various synthetic combinations thereof.

8. The ink composition according to claim 1, wherein the ink composition comprises 0.1-15 wt % of a pigment; 0.1-20 wt % of a carbohydrate; 0.1-20 wt % of a poly(styrene-maleic acid) copolymer and/or poly(maleic acid) copolymer dispersant; 0.1-35 wt % of an organic solvent; and the remainder of the formulation being deionised water.

9. The ink composition according to claim 1, wherein the pigment colorant is selected from the group consisting of organic pigment, inorganic pigment, the lake pigment of a dye and combinations thereof.

10. The ink composition according to claim 1, further comprising at least one additional polymer.

11. The ink composition according to claim 10, wherein the at least one additional polymer is selected from the group consisting of polyurethane dispersions, polyvinyl alcohols, polyesters, polyestermelamines, styrene/acrylic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers, salts thereof, and blends thereof.

12. A printed substrate comprising or derived from one or more of the ink compositions according to claim 1.

13. The printed substrate according to claim 12 which is suitable for food, pharmaceutical, cosmetic and indirect food contact applications.

14. A method for printing, comprising: applying any one or more ink compositions according to claim 1 onto a substrate and curing.

15. A printing method comprising
  (a) printing one or more layers of ink by inkjet deposition onto a substrate; and
  (b) curing the one or more ink layers at a temperature ≥200° C.;
  wherein the inkjet ink comprises one or more carbohydrates, water, one or more pigment colourants, one or more polymeric dispersants, and one or more organic solvents,
  wherein the one or more polymeric dispersants is a poly(styrene-maleic acid) copolymer, a poly(styrene-maleamic acid) copolymer, or a combination thereof;
  wherein the poly(styrene-maleic acid) copolymer and poly(styrene-maleamic acid) copolymer do not contain any maleic anhydride residues;
  and wherein the inkjet ink exhibits a ΔE colour change of ≤3.00 after curing.

16. A printed substrate resulting from the method according to claim 15.

17. The printed substrate according to claim 16, which is suitable for food, pharmaceutical, cosmetic and indirect food contact applications.

* * * * *